US009368046B2

(12) United States Patent
Chen et al.

(10) Patent No.: US 9,368,046 B2
(45) Date of Patent: Jun. 14, 2016

(54) COLOR TACTILE VISION SYSTEM

(75) Inventors: Yi-Chou Chen, Hsinchu (TW); Shih Hung Chen, Jhudong Township, Hsinchu County (TW); Yu-Yu Lin, Wanli (TW); Tung-Hua Chuang, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 1736 days.

(21) Appl. No.: 12/836,498

(22) Filed: Jul. 14, 2010

(65) Prior Publication Data

US 2012/0016472 A1    Jan. 19, 2012

(51) Int. Cl.
*H04N 9/47* (2006.01)
*G09B 21/00* (2006.01)

(52) U.S. Cl.
CPC .................. *G09B 21/003* (2013.01)

(58) Field of Classification Search
IPC ........................................... A61F 9/08
See application file for complete search history.

(56) References Cited

U.S. PATENT DOCUMENTS

| 4,720,706 | A  | * | 1/1988  | Stine ..................... G09G 3/20 345/690 |
| 6,008,721 | A  |   | 12/1999 | Fingerov et al. |
| 6,920,697 | B2 |   | 7/2005  | Raab et al. |
| 7,643,862 | B2 |   | 1/2010  | Schoenefeld |
| 2002/0117611 | A1 | * | 8/2002 | Kley ..................... G11B 9/14 250/234 |
| 2006/0161218 | A1 | * | 7/2006 | Danilov ............... A61B 5/0492 607/45 |
| 2008/0134801 | A1 |   | 6/2008 | Tseng et al. |
| 2009/0168637 | A1 | * | 7/2009 | Tran ..................... G11B 9/1409 369/144 |
| 2009/0310124 | A1 | * | 12/2009 | Thomson ............... G01N 21/03 356/51 |
| 2010/0070254 | A1 |   | 3/2010  | Tsai et al. |

FOREIGN PATENT DOCUMENTS

WO    2007119603 A1    10/2007

OTHER PUBLICATIONS

BrainPort Vision Technology, http://vision.wicab.com/technology/, accessed Aug. 2, 2010.

(Continued)

*Primary Examiner* — Tracy Li
(74) *Attorney, Agent, or Firm* — Haynes Beffel & Wolfeld LLP

(57) ABSTRACT

A tactile display writer unit includes a probe having a contact tip, and at least a first actuator and a second actuator coupled to the probe, whereby activation of the actuators results in a displacement of the probe tip in one or more of a z-direction and in a lateral direction having a vector in an x-y plane. Also, a display writer includes a plurality of such units supported in an x-y array. The writer units may have a third actuator coupled to the probe. Also, a tactile vision system includes such a display writer, an image processor, and an image sensor. The processor transforms RGB image information from the image sensor into hue-based information having two or more attributes; and the actuators in the tactile display writer are activated by the information attributes. Also, a method for producing a tactile color stimulus at a site on the skin of a subject includes providing a probe having a contact tip; displacing the tip at the contact site in a direction generally normal to the skin surface at the site to an extent that relates one attribute of a hue-based model of the color, and displacing the tip in at least one lateral direction generally in a plane parallel to the skin surface at the site to an extent that relates to at least one additional attribute of the color.

7 Claims, 14 Drawing Sheets

(56) References Cited

OTHER PUBLICATIONS

Roland Piquepailles's Technology Trends: See With Your Tounge, http://radio-weblogs/0105910/2004/06/03.html, accessed Aug. 2, 2010.

Color Model, http://en.wikipeida/wiki/Color_Model, accessed Aug. 2, 2010.

Brewster Stephen A, et al, Ch 4.4, Tactile Displays, 2000, Willey Imprint, Inc.

Synopsis of Tongue Display Technology Jan. 3, 2008, http:/kaz.med.wisc.edu/Publiciity/Synopsis.html, accessed Aug. 2, 2010.

The Heidleberg Tactile Vision Substitution System, Maucher, Thorsten et al., 7pps, 6th Int'l Conference on Tactile Aids, Hearing Aids and Cochlear Implants, ISA C2000, Exeter, May 2000 and Int'l Conference on Computers Helping People with Special Needs, ICCHP2000, Karlsruhe, Jul. 2000.

Tactile Vision. 13 pps, http://www.tactilevision.ru/.english.index.php?id=phil_main, accessed Aug. 2, 2010.

Tactile Subsitution for human vision, Moscow 2004, The Russian Public Foundation of Assistance to the Blind and Visually Impaired "Veresk", 10 pps., http://www.docstoc.com/docs/DownloadDoc.aspx?doc_id=26160923>, accessed Aug. 2, 2010.

\* cited by examiner

COLOR TACTILE VISION SYSTEM

BACKGROUND

This invention relates to vision substitution systems and, particularly, to tactile vision substitution systems.

A number of different approaches have been proposed to restore lost vision or to augment existing vision, including visual prosthesis and visual substitution.

Visual prosthesis usually consists of an implanted neural stimulator coupled to an externally-worn camera. Visual prosthetics may provide some restoration of sight for persons who were originally sighted but who lost vision as a result of degenerative eye disease, and success in providing sight to a blind person by way of a visual prosthesis depends upon how the person lost sight. Retinal prosthesis has been proposed and is under development by a number of organizations. This approach may be most successful where loss of vision resulted from degeneration of photoreceptors, and where the optic nerve was fully developed prior to onset of blindness; such degenerative diseases include, for example, retinitis pigmentosa and age-related macular degeneration. Prosthetic systems employing a subretinally implanted microchip are under development by Daniel V. Palanker's research organization at Stanford University, described, for example, in D. Palanker et al. (2005) "Design of a high-resolution optoelectronic retinal prosthesis", *J. Neural Eng.*, Vol. 2, pp. S105-S120; in D. V. Palanker et al. U.S. Pat. No. 7,047,080, titled "Self-sufficient retinal prosthesis powered by intraocular photovoltaic cells"; and in D. V. Palanker U.S. Pat. No. 7,447, 547, titled "Neural prosthesis based on photomechanical deflectors and tactile sensory cells". Robert Greenberg and coworkers associated with Second Sight Medical Products, Inc. have proposed an implanted retinal microelectrode array, described for example in Robert Greenberg et al. U.S. Pat. Nos. 7,263,403, and 7,499,754, titled "Retinal prosthesis". Alan Y. Chow and coworkers associated with Optobionics Corporation have proposed a subretinally implanted microphotodiode array for treatment of retinitis pigmentosa, described for example in Alan Y. Chow et al. (2004) "The Artificial Silicon Retina Microchip for the Treatment of Vision Loss From Retinitis Pigmentosa", *Arch. Ophthalmol.*, Vol. 122, pp. 460-469.

Retinal prosthesis requires surgical intervention, and carries risks associated with implant technologies as well as risks associated with operating an electronic device in close association with nerve tissues. As noted above, visual prosthesis is suitable for persons who were originally sighted and thereafter lost vision owing to degenerative disease. Because the prosthesis is deployed within the eye, it is useful principally for treatment of vision impairment, and is not desired for vision enhancement in sighted persons.

For these reasons, vision substitution approaches may be preferred. Generally, loss of vision results from impairment of the person's capacity to transmit sensory information from the retina to the brain. In a vision substitution system, vision is restored by coupling the intact vision processing pathways with data obtained from another sensory mode such as touch. By sensory substitution, information from touch receptors is relayed to the visual cortex, where it is interpreted and perceived as an image. In a vision substitution system an image capture device (such as a digital camera) generates a signal representing a received image; the signal is processed and relayed to an array of stimulators that are disposed to stimulate touch receptors in an area of the subject's body. Some examples of vision substitution systems follow.

Paul Bach-y-Rita proposed a vision substitution system in which an electrotactile display comprising an array of electrodes is disposed on the tongue of the subject. See, e.g., Paul Bach-y-Rita et al. (1998), "Form Perception with a 49-point electrotactile stimulus array on the tongue: A technical note", *Jour. Rehabilitation Research and Development*; and Paul Bach-y-Rita et al. U.S. Pat. No. 6,430,450, titled "Tongue-based tactile output device". K. Kasmarek and coworkers at the University of Wisconsin have continued developmental work on electrotactile stimulation. A prototype electrotactile tongue display system includes a tongue display unit, a controller, and a camera; and efforts to develop a device suitable for commercial introduction are underway at Wicab, Inc. The system can provide grey scale information, but does not provide color information. The device cannot be used while the tongue is otherwise disposed, as for example while the person is eating or speaking.

Methods used to present visual, auditory, and modified tactile information to the skin were reviewed in Kurt A. Kaczmarek et al. (January 1991) "Electrotactile and Vibrotactile Displays for Sensory Substitution Systems", *IEEE Trans. Biomed. Eng.*, Vol. 38, No. 1. Tactile stimuli may be mechanotactile, electrotactile or thermotactile.

The Russian Republic Foundation of assistance to the blind and visually impaired ("Varesk") is developing a tactile vision system having a tactile display attached on the subject's back. The display includes an array of electrodes. A camera receives an image and sends a signal representing the image to a computer; the computer processes the signal and delivers electrical pulses to the electrodes in the array.

A research group at the Kirchhoff-Institut fur Physik, Ruprecht-Karls-Universitat Heidelberg (Heidelberg) has presented a tactile vision substitution system that employs a "virtual tactile display" (VTD) that receives data either from camera systems equipped with suitable image processing capabilities. See, Thorsten Maucher et al., "The Heidelberg Tactile Vision Substitution System", paper presented at the ICCHP2000, Karlsruhe, July 2000. The VTD includes a movable tactile output unit having tactile elements, each having movable piezoelectric actuators arranged in a standard Braille matrix. The tactile output unit is scanned over a large pad area. The system includes CMOS cameras and dedicated VLSI chips for image acquisition and pre-processing. Heidelberg has additionally proposed a pneumatic tactile display, in which tactile stimuli are applied to the skin by an array of compressed-air driven pistons. Reference is made to the Heidelberg site at <http://www.kip.uni-heidelberg.de/>

SUMMARY

In one general aspect the invention features a tactile display writer unit that includes a probe having a contact tip, and a first actuator and at least a second actuator coupled to the probe, whereby activation of the actuators results in a displacement of the probe tip in a z-direction and in a displacement of the probe in a lateral direction having a first vector in an x-y plane. In some embodiments the writer unit includes a third actuator coupled to the probe. In some embodiments activation of the first actuator results in a displacement of the probe tip in a z-direction and action of the second actuator results in a displacement of the probe in a lateral direction having a first vector in an x-y plane; and in embodiments having a third actuator actuation of the third actuator results in a displacement of the probe in a lateral direction having a second vector in the x-y plane.

In another general aspect the invention features a tactile display writer unit that includes a cap having an apex and a probe at the apex having a contact tip, at least a first and a second actuator coupled at first and second sites on the cap, whereby activation of the first actuator results in a displacement of the first site in a direction having a first vector in a z-direction, and whereby activation of the second actuator results in a displacement of the second site in a direction having a second vector in a z-direction. In some embodiments the writer unit includes a third actuator coupled at a third site on the cap whereby activation of the third actuator results in a displacement of the third site in a direction having a third vector in a z-direction. In some embodiments the coupling sites are located on a side of the cap opposite the apex. In some embodiments a difference between the displacements of the first and second sites, or between the displacements of the first site and either one of the second and third sites, results in a tilting of the cap and a displacement of the probe in a lateral direction having a vector in an x-y plane.

In another aspect the invention features a display writer that includes a plurality of such units supported in an x-y array.

In another general aspect the invention features a tactile vision system that includes such a display writer, an image processor, and an image sensor. The processor transforms RGB image information from the image sensor into hue-based information having two or more attributes; and the actuators in the tactile display writer are activated by the information attributes.

In another general aspect a method for producing a tactile color stimulus at a site on the skin of a subject includes aligning a probe having a contact tip with the site; displacing the tip at the site in a direction generally normal to the skin surface at the site to an extent that relates one attribute of a hue-based model of the color, and displacing the tip in at least one lateral direction generally in a plane parallel to the skin surface at the site to an extent that relates to at least one additional attribute of the color.

In various embodiments the invention can provide color tactile display as an aid to persons who have lost vision or whose vision is compromised, as well as to enhance visualization for sighted persons. No surgery or other invasive procedure is required to implement the invention.

BRIEF DESCRIPTION OF THE DRAWINGS

FIG. 11B is in an elevational view; FIG. 11A is in a first (top) plan view; and FIG. 11C is in a second (bottom) plan view.

DETAILED DESCRIPTION

The invention will now be described in further detail by reference to the drawings, which illustrate alternative embodiments of the invention. The drawings are diagrammatic, showing features of the invention and their relation to other features and structures, and are not made to scale. For improved clarity of presentation, in the FIGs. illustrating embodiments of the invention, elements corresponding to elements shown in other drawings are not all particularly renumbered, although they are all readily identifiable in all the FIGs. Also for clarity of presentation certain features are not shown in the FIGs., where not necessary for an understanding of the invention.

Figure 1A:
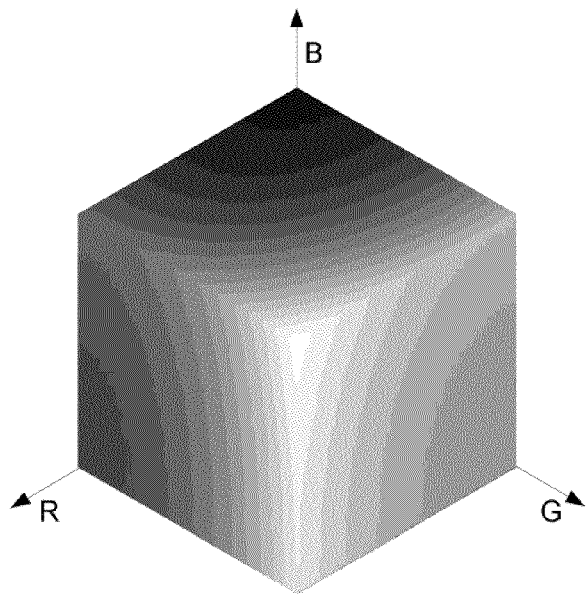
FIG. 1A is a graphical representation of a red-green-blue (RGB) color model, 1B and 1C are hue-based color model diagrams.

Colors are ordinarily defined by three components, and accordingly in various color models a three-dimensional volume is described by projecting the values of the components as Cartesian components in a Euclidean space. For the red-green-blue (RGB) color model, for example, as shown in FIG. 1A, RGB model, this is represented by a cube using non-negative values within a 0-1 range and assigning black to the origin at the vertex (0, 0, 0), and with increasing intensity values running along the three axes (R, G, B) up to white at the vertex (1, 1, 1), diagonally opposite black. An RGB triplet (r, g, b) represents the three-dimensional coordinate of the point of the given color within the cube or its faces or along its edges.

Figure 1B:
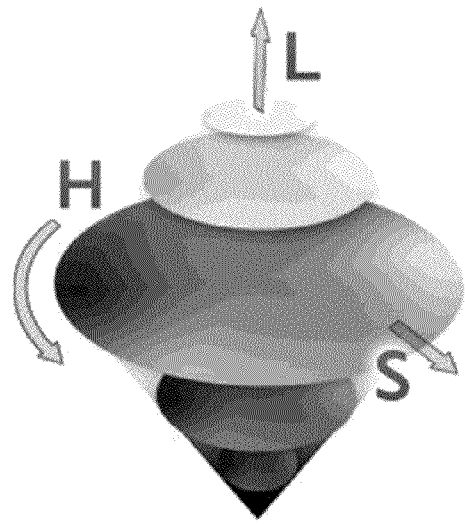
Figure 1C:
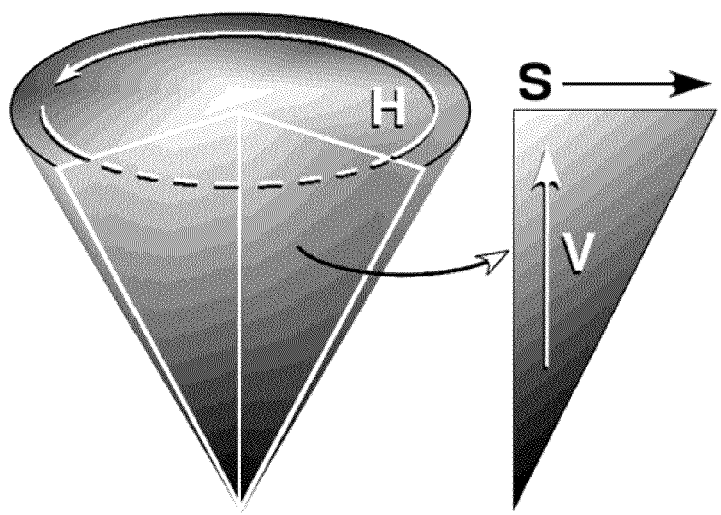

Hue-based color models can in some uses of color more usefully emulate the manner in which color is actually perceived. FIGS. 1B and 1C represent hue-based color models. FIG. 1B shows a hue-saturation-lightness (HSL) color space, illustrated as a biconical solid. Lightness is represented along the z-axis from black (at the bottom) to white (at the top); saturation is represented by distance in the x-y plane from the z-axis; and hue is represented by the angle in the x-y plane around the z-axis, with red at angle 0°. Colors having a given lightness value are situated in a color circle perpendicular to the z-axis; fully-saturated colors are at the edges of color circles. FIG. 1C shows a hue-saturation-value (HSV) color space, illustrated as an inverted cone of colors, with a black point at the bottom and fully-saturated colors around a circle at the top. Value is represented along the z-axis from black (at the bottom) to white (at the center of the circle at the top); saturation is represented by distance in the x-y plane from the z-axis; and hue is represented by the angle in the x-y plane around the z-axis, with red at angle 0°.

Image-capture devices such as cameras typically employ an RGB color model. The RGB signal can be converted to a hue-based model using a straightforward transformation. An example of a known approach to converting red-green-blue (RGB) coordinates in a RGB space (which may by provided by a digital image array) to hue-saturation-lightness (HSL) or hue-saturation-value (HSV) vectors in a hue-based space (which can be deployed to a color visual array.) follows. Reference is made to the article at <http://en.wikipedia.org/wiki/HSL_and_HSV>.

Let r, g, b∈[0,1] be the red, green, and blue coordinates, respectively, of a color in RGB space.

Let max be the greatest of r, g and b, and min the least.

To find the hue angle h∈[0,360] for either HSL or HSV space, compute:

$$h = \begin{cases} 0, & \text{if max = min} \\ \left(60° \times \frac{g-b}{\max - \min} + 360°\right), & \text{if max = } r \\ 60° \times \frac{b-r}{\max - \min} + 120°, & \text{if max = } g \\ 60° \times \frac{r-g}{\max - \min} + 240°, & \text{if max = } b \end{cases}$$

The value of h is generally normalized to lie between 0 and 360°, and h=0 is used when max=min (that is, for grays), though the hue has no geometric meaning there, where the saturation s=0. Similarly, the choice of 0 as the value for s when l is equal to 0 or 1 is arbitrary.

The definition of hue is the same in HSV and HSL systems, but the other components differ.

To find saturation and lightness s,l∈[0,1] for HSL space, compute:

$$l = \frac{1}{2}(\max + \min)$$

$$s = \begin{cases} 0, & \text{if max = min} \\ \frac{\max - \min}{\max + \min} = \frac{\max - \min}{2l}, & \text{if } l \leq \frac{1}{2} \\ \frac{\max - \min}{2 - (\max + \min)} = \frac{\max - \min}{2 - 2l}, & \text{if } l > \frac{1}{2} \end{cases}$$

The values for saturation s and value v of an HSV color are defined as follows:

$$s = \begin{cases} 0, & \text{if max = 0} \\ \frac{\max - \min}{2(\max + \min)} = \frac{\max - \min}{2 - 2l}, & \text{otherwise} \end{cases}$$

$$v = \max$$

The range of HSV and HSL vectors is a cube in the Cartesian coordinate system; but because hue is really a cyclic property, it is not so necessary or appropriate to unwrap it, with a cut at 0 (red), into a linear coordinate. Accordingly, visualizations of these spaces usually involve hue circles. Cylindrical and conical (bi-conical for HSL) depictions are most popular, and spherical and other color solids are also possible depictions.

Figure 2:
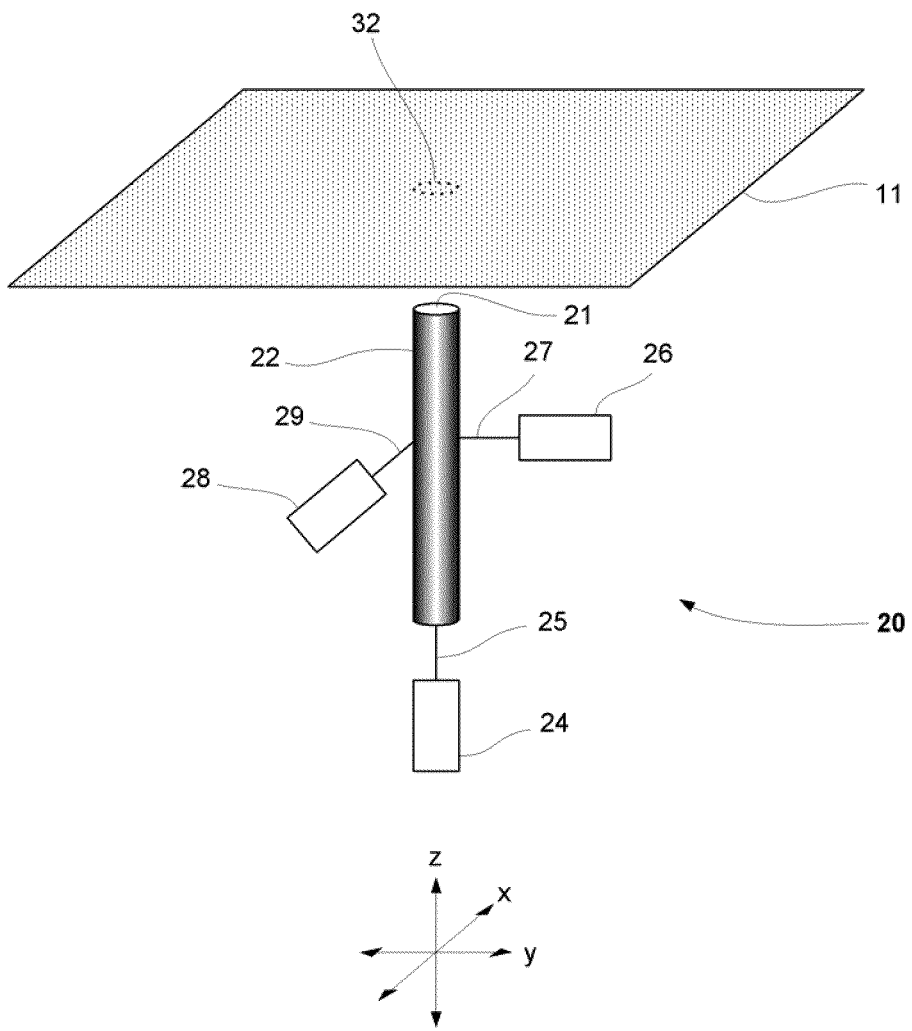
FIG. 2 is a diagrammatic sketch showing a tactile display device in a diagrammatic perspective view, according to an embodiment of the invention.

FIG. 2 shows a tactile display device ("writer unit") 20 according to an embodiment of the invention, aligned in relation to an area of a subject's skin 11. For reference purposes, x-y-z coordinates are shown, and the skin is said to lie generally in the x-y plane. The writer unit has a movable probe 22 having a contact tip 21. A first actuator 24 ("Actuator A") is coupled (25) with the probe 22 in such a manner that upon activation, the first actuator 24 causes the tip 21 of the probe to move in a direction having a vector in the z-direction toward or away from a contact spot 32 on the skin. The device itself may be said to have a z-axis along which the tip of the probe is moved by the first actuator. A second actuator 26 ("Actuator B") is coupled (27) with the probe 22 in such a manner that upon activation, the second actuator 26 causes the tip 21 of the probe to move in a lateral direction having a first vector in the x-y plane. A third actuator 28 ("Actuator C") is coupled (29) with the probe 22 in such a manner that upon activation, the third actuator 28 causes the tip 21 of the probe to move in a lateral direction having a second vector in the x-y plane.

Figure 3B:
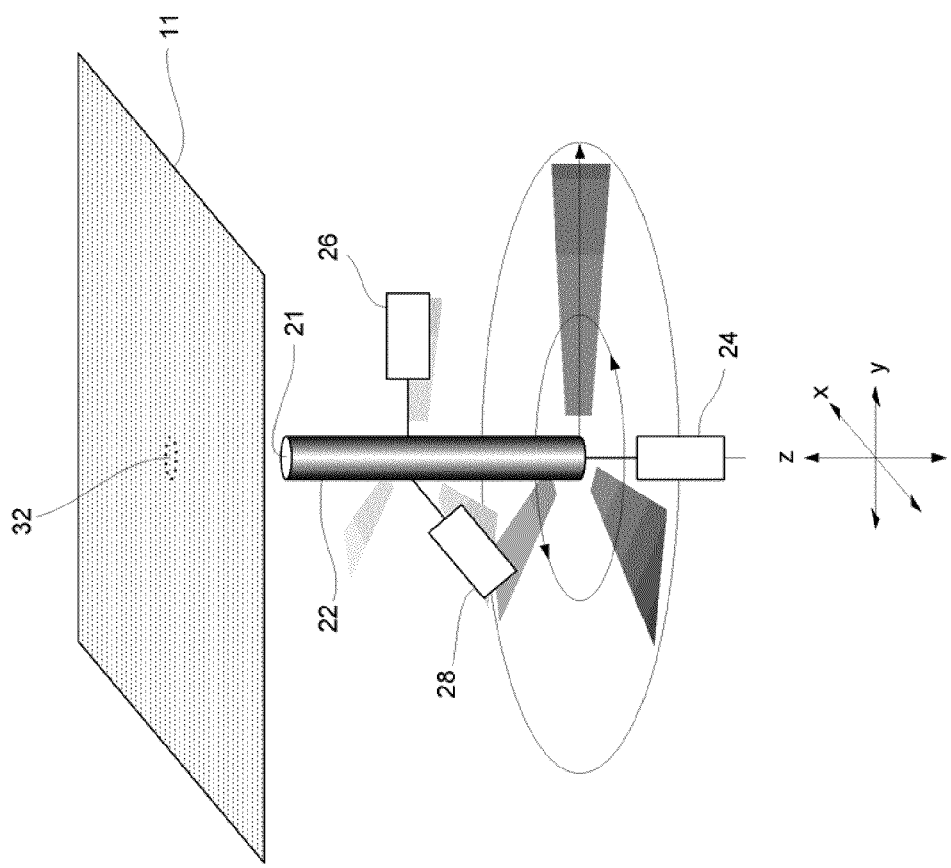
FIGS. 3A and 3B are diagrammatic sketches showing a relationship of a color in a hue-based representation with a tactile display device and with a contact site on the skin, according to an embodiment of the invention.
Figure 3A:
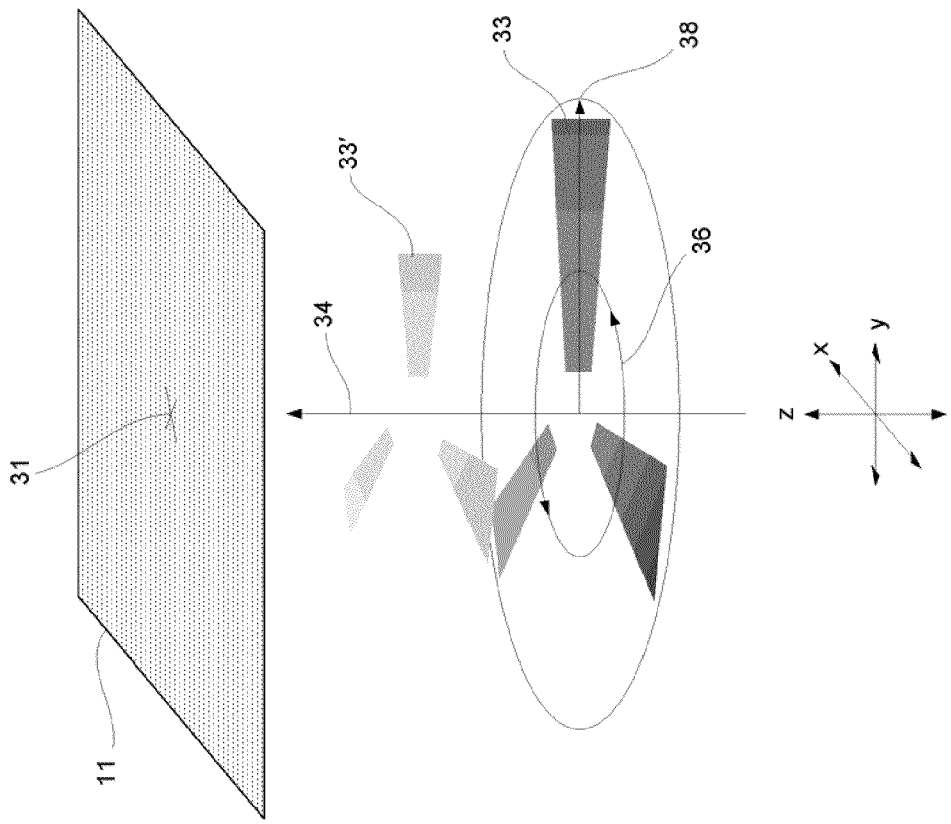

FIGS. 3A and 3B show how a tactile display device, such as for example the writer unit as shown in FIG. 2 can form a color-informed tactile stimulus at the contact site on the skin. For reference purposes, x-y-z coordinates are shown, and the skin is said to lie generally in the x-y plane. By way of example, the geometry of a HSL space is shown in relation to a site 31 on the skin in FIG. 3A. Portions of two color circles 33, 33', at different lightness levels, are shown. The lightness range 34 is represented in the z-axis; hue is represented as an angle 36 in an x-y plane about the z-axis; and saturation is represented by a distance 38 in an x-y plane perpendicular to the z-axis. The z-axis is directed toward a site 31 on the skin 11. FIG. 3B shows a relationship of HSL space with a tactile display device and with a contact site on the skin, according to an embodiment of the invention. As the superposition of the writer unit and the geometry of the color space shows, movement of the probe 22 by activation of the first actuator 24, resulting in a displacement of the probe end 21 in the z-direction, can define lightness; movement of the probe 22 by activation of the second actuator 26, resulting in a displacement of the probe end 21 in a direction having a first vector in the x-y plane, can define hue; and movement of the probe 22 by activation of the second actuator 28, resulting in a displacement of the probe end 21 in a direction having a second vector in the x-y plane, can define saturation.

Figure 4:
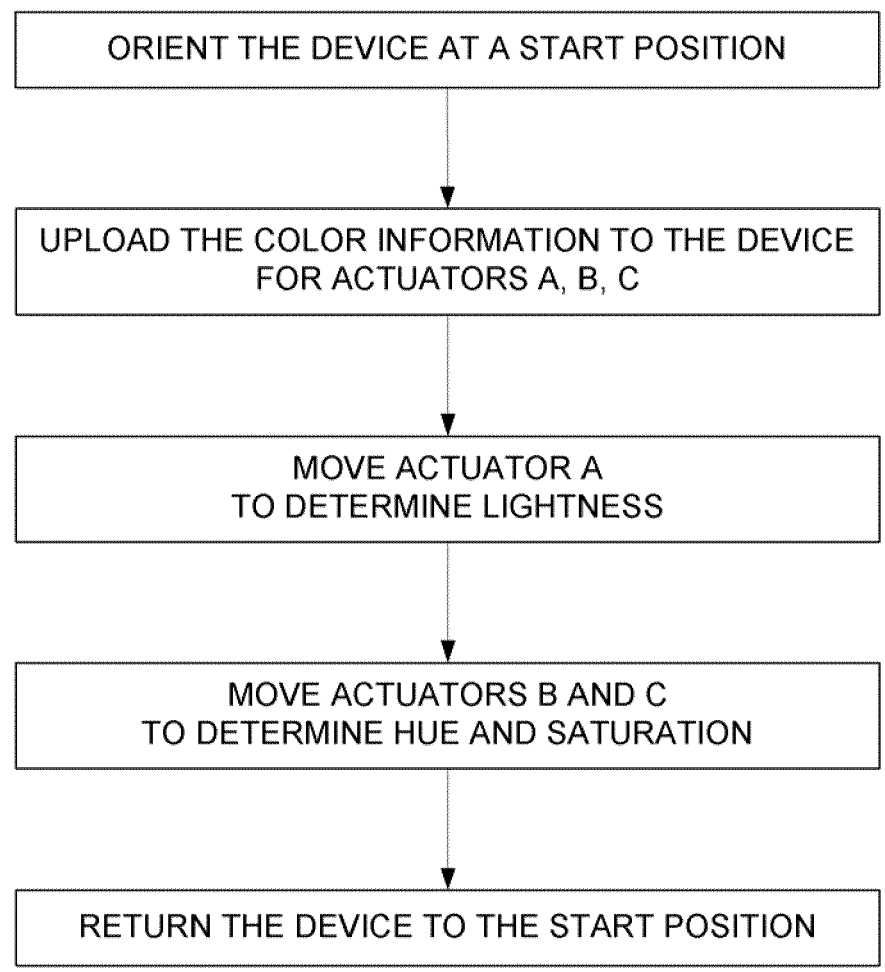
FIG. 4 is a flow diagram showing a process implementation for a tactile display device, according to an embodiment of the invention.

The device can be used as follows. Referring to FIG. 4, the device is placed in a start position, with the probe tip adjacent a contact site on the subject's skin surface, and with the z-axis of the device oriented generally normal to the plane of the skin surface at the site. The tip may contact or nearly contact the skin site when the device is in the start position. Color information is uploaded to the device for the actuators. Actuator A is activated in response to the lightness information, moving the probe tip toward the skin site and pressing onto and displacing the skin surface at the site. Actuators B and C are activated in response to the hue and saturation information, displacing the probe tip in the first and second lateral directions. The device is returned to the start position by deactivating the actuators. The subject senses the displacements of the probe tip in relation to the skin surface as a momentary tactile sensation of the color represented by the uploaded information. The tip may slide over the skin surface during the displacements in the lateral directions, and a lubricant (such as a gel or oil or ointment, for example) may be applied to facilitate the sliding movement of the tip. Or, the tip may not slide over the skin surface, so that the lateral movements are perceived by the subject as stretching of the skin and the skin may be treated at the contact site to increase the friction between the tip and the skin.

In one configuration, the amount of displacement is scaled to the color information so that, for example, a range of displacement in the z-direction relates to a range of lightness, a range of displacement in the first x-y direction relates to a range of hues, and a range of displacement in the second x-y direction relates to a range of saturation levels. For example, the actuator A displacement is perceived by the subject as a pressure at the skin site, and the actuator may be designed to provide a greater displacement for either greater or lesser lightness. And, for example, the actuator C may be designed to provide a greater displacement (sliding over or stretching the skin) for either greater or lesser saturation.

In other configurations, some other parameter of the displacement may be scaled to the color information. For example, the tip may be displaced more or less quickly, and a range of speeds of the displacement may be scaled to the color information. For example, the actuator A displacement may be designed to provide a more rapid displacement for either greater or lesser lightness. And, for example, the actuator C may be designed to provide a more rapid displacement (sliding over or stretching the skin) for either greater or lesser saturation.

Figure 5:
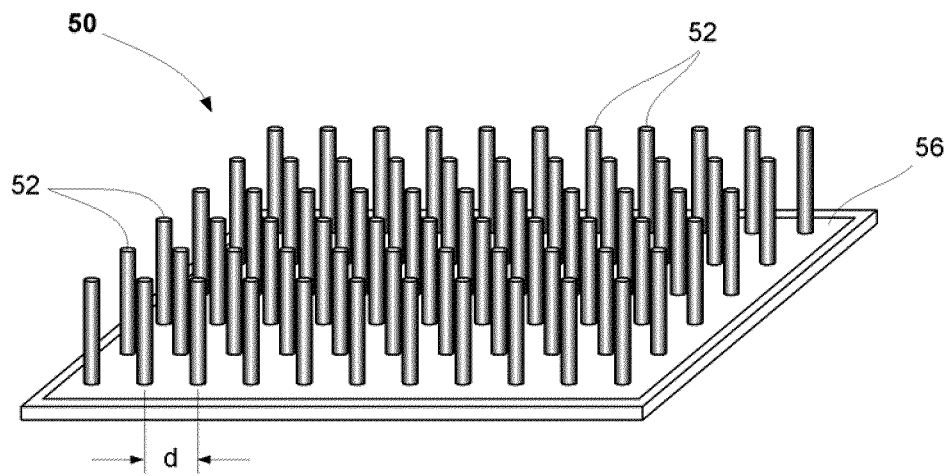
FIG. 5 is a diagrammatic sketch in a perspective view showing a color visual array, according to an embodiment of the invention.

An array of such writer units can be employed to provide color information to an array of corresponding sites on the skin, enabling the subject to perceive a color image. FIG. 5 illustrates at 50 a simplified rectangular array (rows and columns) of writer units. The writer units 52 are held in a support 56. The resolution of the spots in the perceived image is determined by the distance between the probe tips in the array and, accordingly, the higher the probe tip density in the array, the finer the resolution. The distance between neighboring writer units is indicated along a row at d in FIG. 5, and in this simplified array the probe tips are substantially uniformly spaced in the x and y directions.

Figure 6:
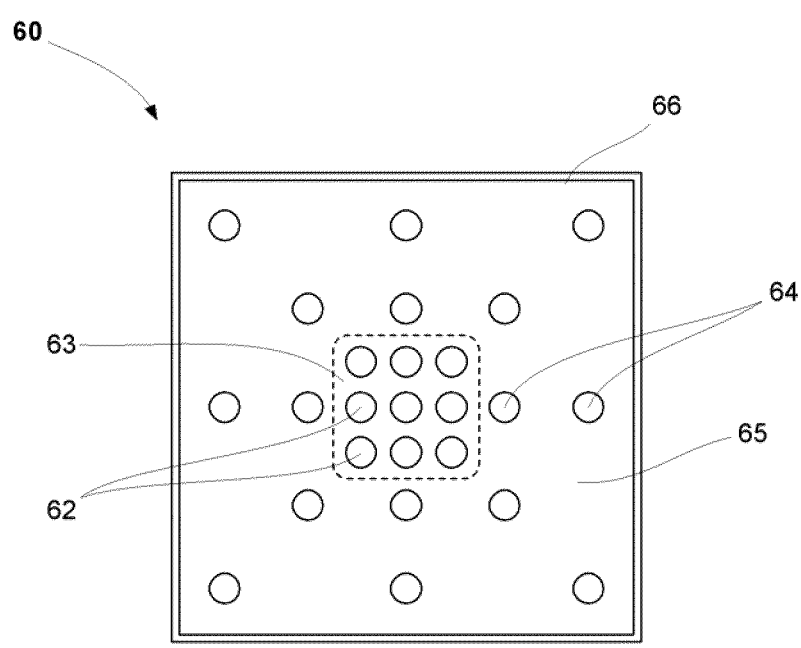
FIG. 6 is a diagrammatic sketch in a plan view showing a color visual array, according to another embodiment of the invention.

Other arrangements of writer units in the array are possible. For instance, as is well known, the human visual field has a finer resolution in a small central than more peripheral areas, and the writer units can be arranged at a higher density in a central region than in a peripheral region. An example of such an array is illustrated at 60 in FIG. 6. The writer units 62, 64 are held in a support 66. The writer units 62 are more densely arrayed in a region 63 outlined by a broken line in the FIG., and less densely arrayed in a peripheral region 65.

Certain parameters of cutaneous perception may force design limits on resolution of spots. For a review of cutaneous perception as it relates to tactile displays, see, e.g., S. A. Brewster et al., "Tactile Displays" in A. Helal et al., eds., *The Engineering Handbook on Smart Technology for Aging, Disability and Independence*, John Wiley and Sons, 2008. For example different body locations have different levels of sensitivity and spatial acuity, and various skin locations have been proposed, including fingertip, forearm, thigh, abdomen, back, for example. The fingertip has a lower threshold of contact discrimination, ranging as low as about 0.9 mm between adjacent points of stimulus, and the threshold differs at different amplitudes of pressure or displacement (indentation of the skin). And, for example, sensitivity and spatial acuity at a particular site may vary according to the time interval between sequential displacements at the site and the speed of the individual displacements. And, for example, sensitivity and spatial acuity may be affected the character of the skin itself, such as whether the skin is glabrous or hairy, and may change as the subject ages.

It may be desirable to select a skin location having lower thresholds for sensitivity and spatial acuity, but it may on the other hand be desirable to select a skin location that is not to be employed for other purposes during the image perception. For example, it may be desirable to permit the subject full use of all the fingers during image perception and, in such circumstances, it may be preferable to employ a skin location other than the fingertips for image perception, even though the sensitivity and visual acuity may be poorer at the other location.

As a matter of mechanical design, the size of the writer units may force design limits on probe tip density and, depending upon the dimensions of the writer units, the distances between adjacent probe tips in the array may necessarily exceed the tactile spatial resolution of the particular skin area. Where the probe tip density in the array is limited, the area of the array (and of the skin underlying the array) may be made large to accommodate a desired number of probe tips.

Figure 7A:
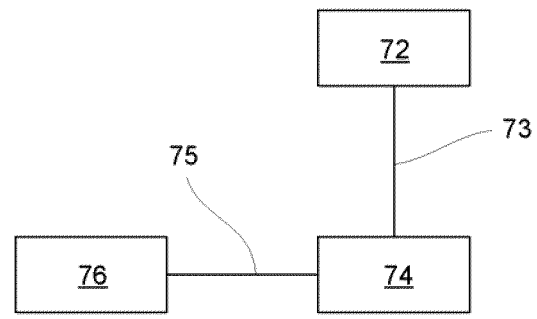
FIG. 7A is a diagrammatic sketch showing in generalized overview relationships of basic elements of a tactile vision system according to an embodiment of the invention.

Referring to FIG. 7A, a system for implementing the tactile vision array includes, in overview, three general functionalities, namely color image sensing, by way of an image sensor 72; color image processing, by way of an image processor 74; and tactile color writing, by way of an image writer 76. Data are exchanged between (73) the color image sensor 72 and the color image processor 74; and between (75) the color image processor and the image writer 76. Data exchange may be wired or wireless.

The image sensor 72 may be, for example, a digital imaging device such as a digital camera. The image sensor may include, for example, a CMOS image sensor. The camera receives incoming light, and generates a signal representing the image. The camera may deliver, for example, a RGB (red-green-blue) signal.

The image processor 74 may be for example, a computer (such as a personal computer, PC), programmed to receive the image from the image processor, and to perform a transformation from RGB (for example) to a hue-based color representation (such as, for example, HSV or HSL) o a pixel-by-pixel basis. The transformation may be by way of a JAVA applet, for example. The output from the image processor includes the hue-based color information along with information on contrast, for each pixel.

The image writer 76 includes an array of writer units, each having a probe and at least two (optionally three) actuators coupled to the probe and activatable to move the probe tip. A first actuator (actuator A) serves to move the probe tip in a z-direction; a second actuator (actuator B) serves to move the probe tip in a first lateral direction (in an x-y plane); and a third actuator (actuator C)—where present—serves to move the probe tip in a second lateral direction (in the x-y plane).

The camera may have significantly greater resolution (pixel density) within the field of view than can be provided in the image writer array. Accordingly, a reduced pixelated image may be used. The image processor may treat the high-resolution image to an image having lower pixel number.

In some implementations, all the functionalities of the tactile vision array system can be carried by the subject. One such implementation is shown by way of example in FIG. 7B. In this example, the image writer array 76 is mounted on an area of the skin over the subject's forehead; and the camera 72 and processor 74 are mounted over the subject's head. The image writer array support in this example may include a flexible adhesive tape, for example, and the camera and processor may be mounted on a decorative hair clip, for example.

Figures 8A, 8B:
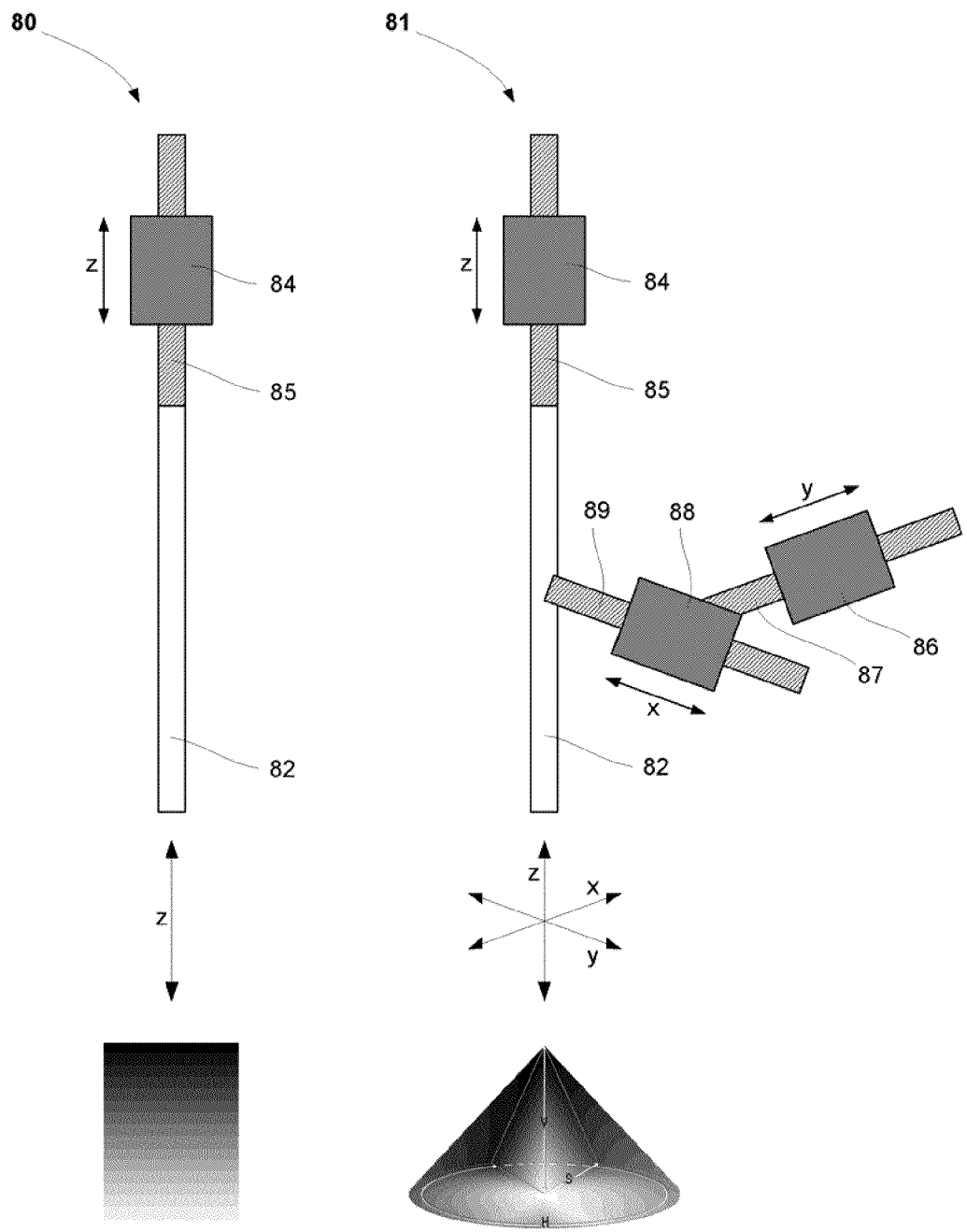
FIG. 8A is a diagrammatic sketch showing a tactile display device in a contrast (gray scale) write mode, in a diagrammatic perspective view, according to an embodiment of the invention.
FIG. 8B is a diagrammatic sketch showing a tactile display device in a color write mode, in a diagrammatic perspective view, according to an embodiment of the invention.

In some implementations, the tactile image writing may be carried out in two stages, as illustrated in FIGS. 8A and 8B. In one stage, referring to FIG. 8A, the z-axis actuator 84, 85 first receives contrast (grey-scale) information from the processor, and causes a displacement of the probe 82 in a z-direction; the displacement correlates with the level of the signal on the grey scale. In a second stage, referring to FIG. 8B, the z-axis actuator 84, 85, and the two x-y plane actuators 86, 87 and 88, 89, receive the hue-based (HSV or HSL) information from the processor, and cause displacements of the probe 82 in the z-direction and in the x-y plane.

Figure 10:
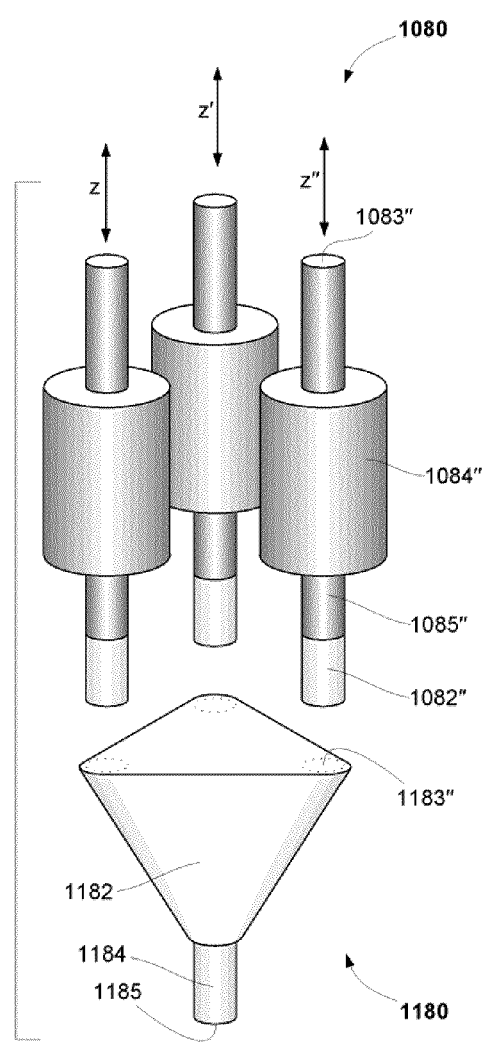
FIG. 10 is a diagrammatic sketch in an exploded perspective view showing a device probe and actuators according to an embodiment of the invention.
Figure 10:
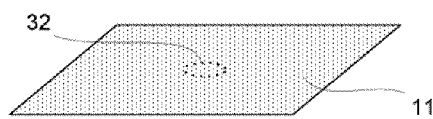
Figure 11A:
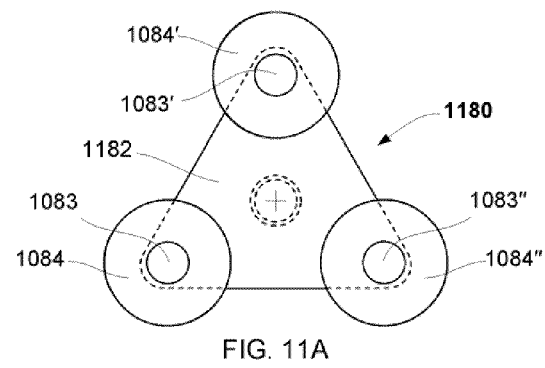
FIG. 11A, 11B, 11C are diagrams showing a tactile display device having a probe and actuators as in FIG. 10.
Figure 11B:
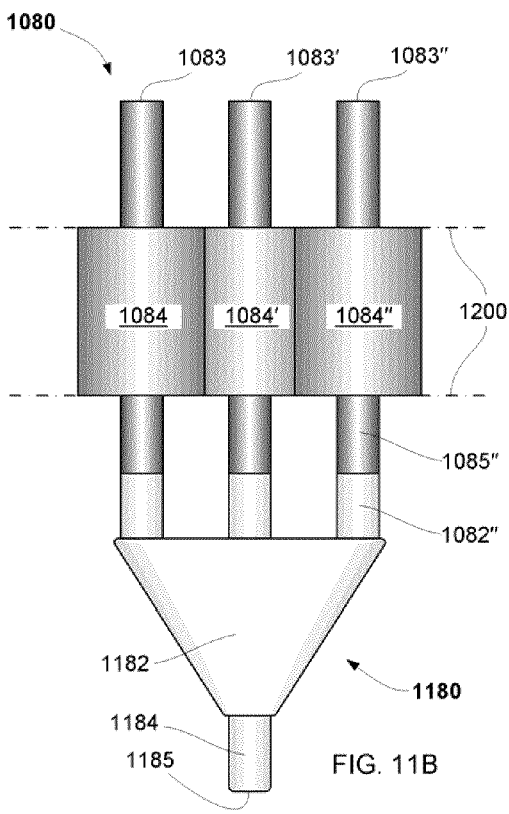
Figure 11C:
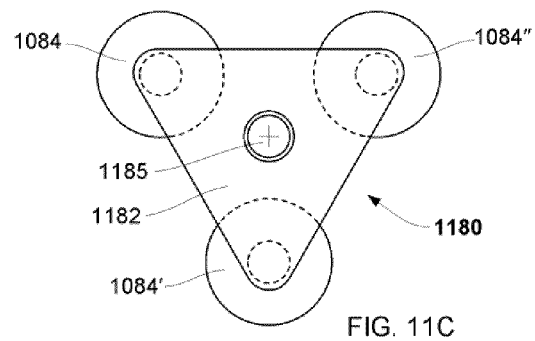

FIG. 10 and FIGS. 11A-11C show a tactile display device ("writer unit") 1080 according to an embodiment of the invention FIG. 10 shows the writer unit in an exploded perspective view, aligned in relation to an area of a subject's skin 11. For reference purposes, x-y-z coordinates are shown, and the skin is said to lie generally in the x-y plane. The writer unit may be said to have a z-axis which, in use, is oriented generally perpendicularly to the x-y plane of the skin.

In this embodiment the writer unit has a cap 1182 shaped, in this example, as a tetrahedron, having an apex. The apex of the probe is directed generally toward the skin, and an opposite side of the probe faces away from the skin. The cap is mounted so that it can tilt off the z-axis and can move toward and away from the skin. A probe 1184 is mounted at the cap apex, presenting a contact tip 1185 to the skin. The writer unit in this example has a set 1080 of three actuator units 1084, 1084', 1084", coupled with the cap 1182. In the example shown in the FIGs., each actuator includes a shaft 1085, 1085', 1085", each having an end 1082, 1082', 1082". Each actuator end 1082, 1082', 1082" is coupled near a corner 1183, 1183', 1183" of the side of the cap 1182 facing away from the skin, so that upon activation, the actuator causes a corner of the cap to move in a direction having a vector in the z-direction. An equal activation of all three actuators will cause an equal displacement of all three corners of the cap in the z-direction, resulting in corresponding movement of the contact tip 1185 in the z-direction against the skin. A differential activation of the actuators causes differential displacement of the three corners of the cap, tilting the cap and resulting in a movement of the contact tip 1185 in a direction toward the skin (having a vector in the z-direction) and a lateral direction (having a vector in the x-y plane). The actuator end may be coupled with the cap by, for example, a tether, which may be a flexible and/or elastic strand; or for example a spring, affixed to, respectively, the actuator end and the cap. Or, the actuator end may be coupled with the cap by, for example, affixing it using an elastic adhesive.

Figure 13:
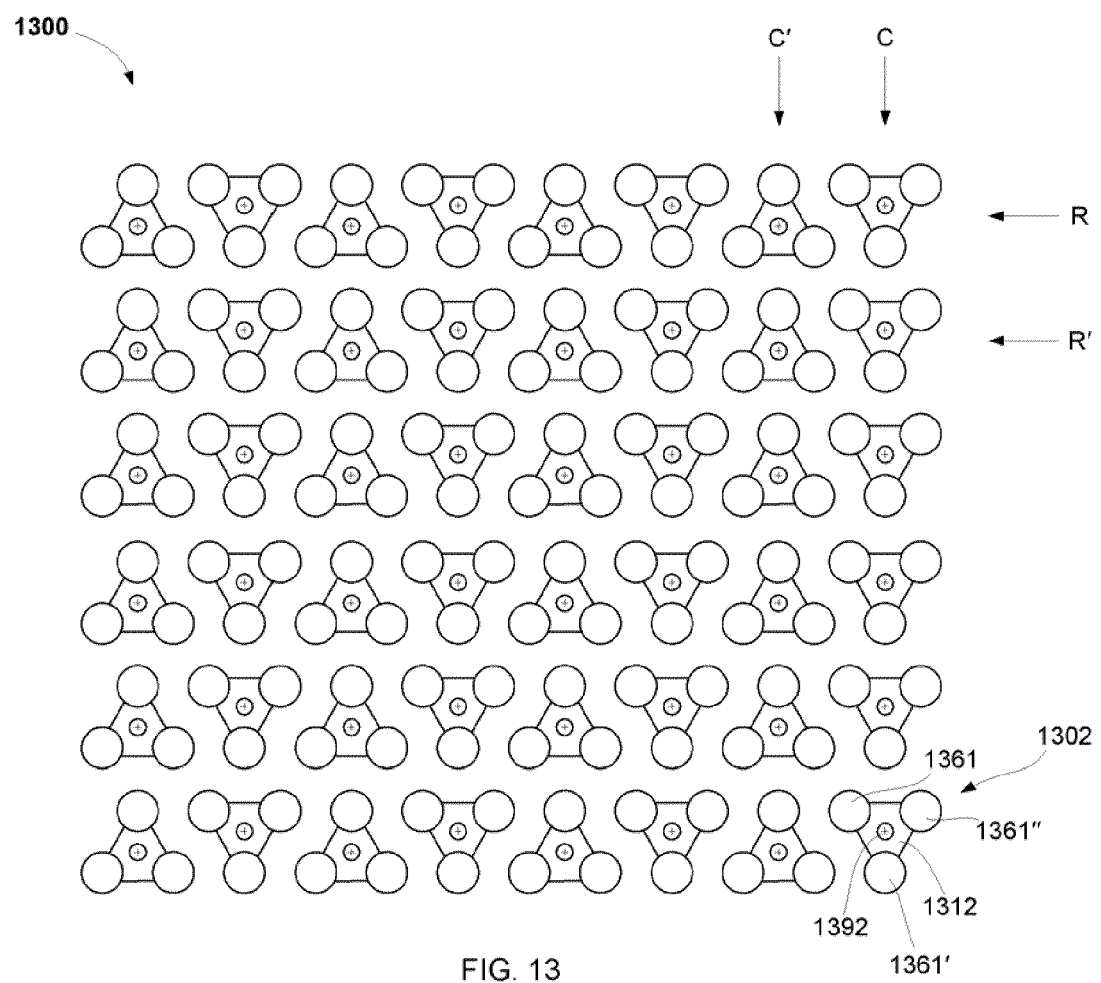
FIG. 13 is a diagrammatic sketch in a plan view showing a color visual array, according to another embodiment of the invention.

As described in further detail below, the writer unit 1080 is supported with other similar writers in an array; the broken lines 1200 indicate symbolically an array support. As described below with reference to FIG. 13, the array of writer units may preferably be capable of conforming to a contoured skin surface. The writer units may be held in an array by fastening them together using, for example, a solder or adhesive; there it is desired that such an array be capable of conforming to a contoured surface, a resilient adhesive or other fastener may be used. Or, the writer units may, for example, be mounted in an array in a mechanical matrix, which may be constructed of a material such as, for example, a metal or polymer, or ceramic material. Where it is desired that the array of writer units be capable of conforming to a contoured surface, the writer units may be mounted using a resilient or flexible material; or, the matrix may itself be constructed to be flexible. The matrix may, for example, be formed of a flexible and/or resilient material, such as a resilient or elastic polymer (e.g., rubber or plastic).

Figure 12A:
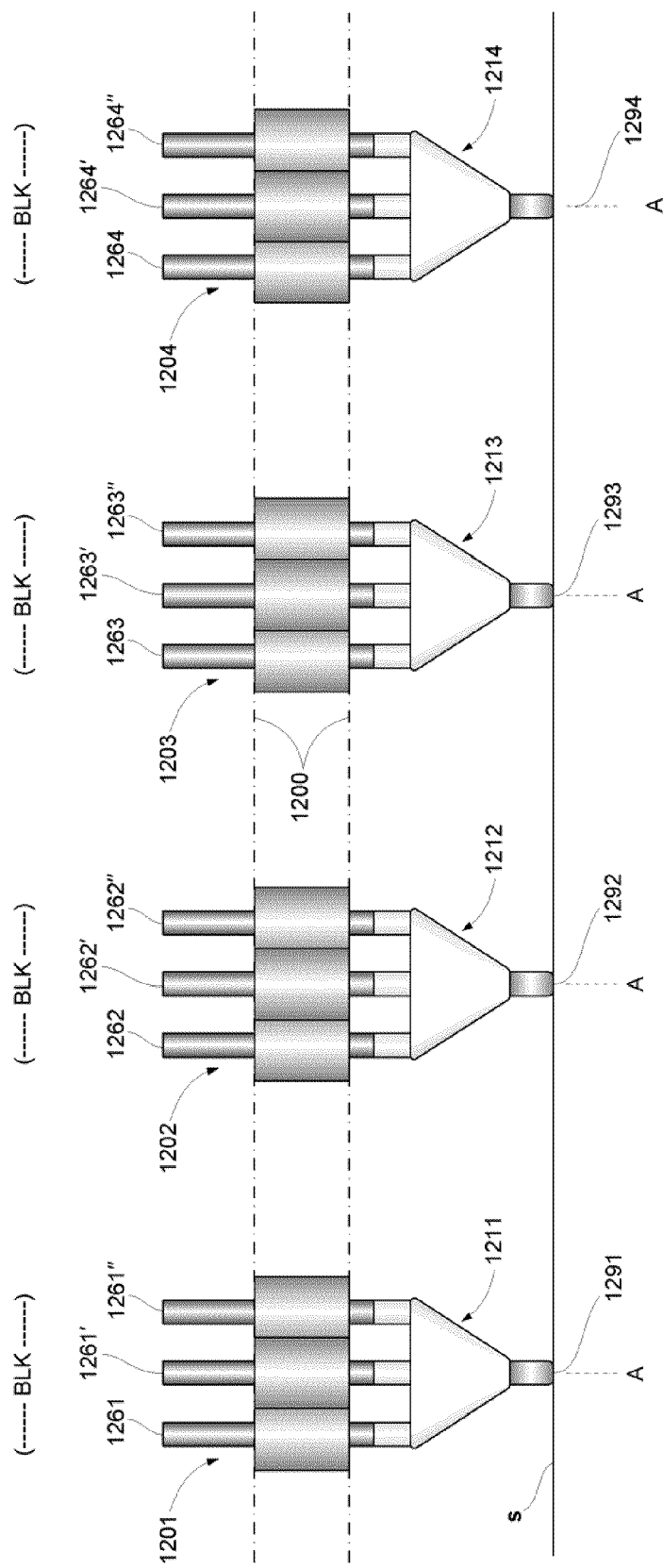
FIG. 12A is a diagrammatic sketch showing an array of tactile display devices, configured as in FIGS. 11A, 11B, 11C, in a plan view, poised at the skin surface of a subject.
Figure 12B:
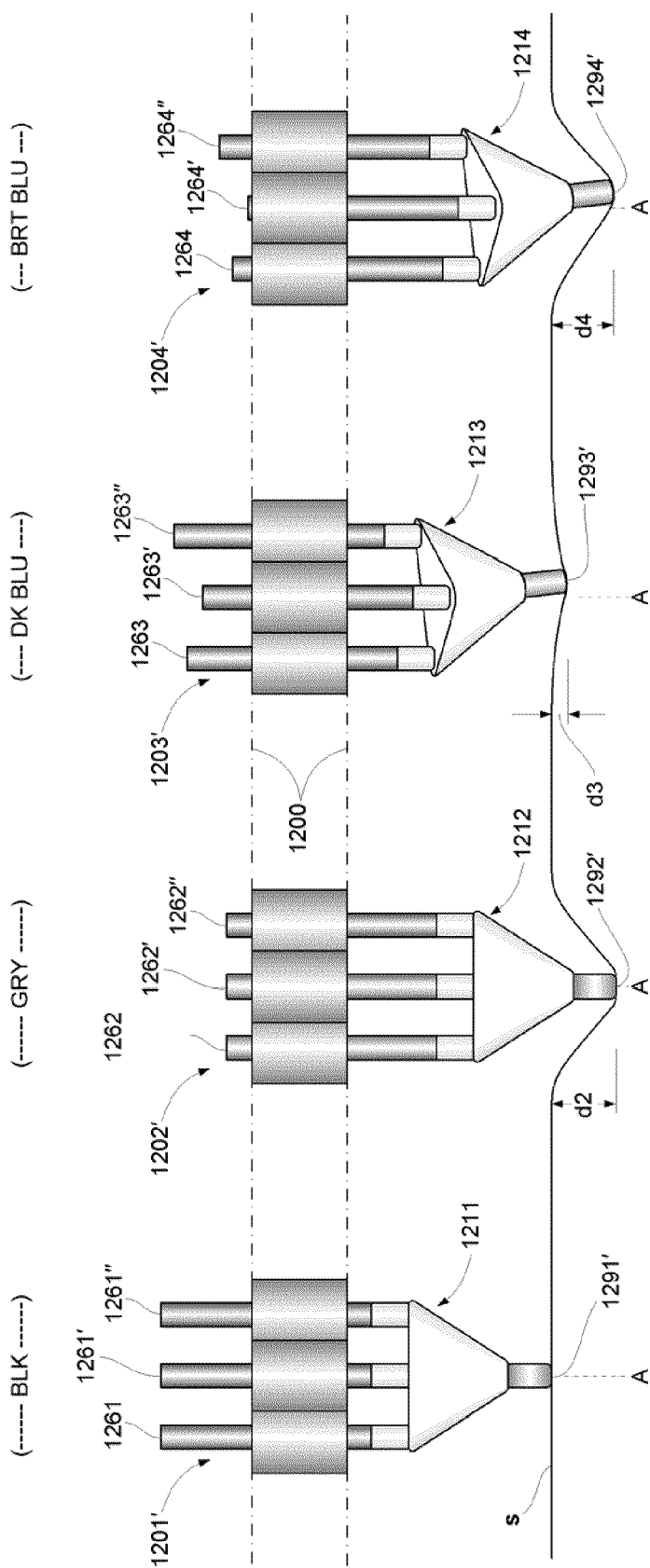
FIG. 12B is a diagrammatic sketch showing an array of tactile display devices as in FIG. 12A, moved in various ways against the skin of a subject to indicate various color values.

Operation of an array of such tactile display writing devices ("writing units") is illustrated in FIGS. 12A and 12B. FIG. 12A shows a row of four writing units 1201, 1202, 1203, 1204, in a start position, with the respective contact tips 1291, 1292, 1293, 1294 adjacent contact sites on the subject's skin surface s, and with the z-axes (indicated by "A") of the devices oriented generally normal to the plane of the skin surface at the site. In this illustration the skin surface is shown as perpendicular to the plane of the page. The contact tips may contact (as shown here) or nearly contact the skin site when the apparatus is in the start position.

In the start position, the actuators in each writing unit are at rest, so they impose no force on the respective corners of the cap, and there is no downward displacement (in the z-direction, toward the skin) or lateral displacement (in an x-y direction) of the contact tip. This may be recognized by the subject as, for example "black" (BLK in the FIGs.).

Then the color information for the image that the subject is to sense is uploaded to the array of devices, and an actuation signal is sent to the actuators, causing them to move accordingly, as shown in FIG. 12B.

Particularly, the part of the image corresponding to the position of writing unit 1201 is "black"; accordingly, following the activation signal none of actuators 1261, 1261', 1261" in writing unit 1201' is displaced, and there is no downward or lateral displacement of the contact tip 1291'. As before the activation signal, this is recognized by the subject as "black" (BLK).

The part of the image corresponding to the position of writing unit 1202 is a "gray"; accordingly, following the activation signal all of actuators 1262, 1262', 1262" in writing unit 1202' are displaced to the same extent, resulting in a downward (against the skin surface, in the z-direction, along the device axis A) of the contact tip 1292'. The subject recognizes this as a "gray" (GRY in the FIG.). A greater downward displacement corresponds, in this example, to a greater brightness value (V, in the HSV color scheme). The subject recognizes the grayscale value accordingly: a greater displacement against the skin in the z-direction is recognized as a "lighter" gray.

The part of the image corresponding to the position of writing unit 1203 is a "dark blue"; accordingly, following the activation signal one or more of the actuators 1263, 1263', 1263" in writing unit 1203' is displaced to some extent. The extent of displacement of at least one of the actuators is different from that of the others; and, as illustrated here, all three actuators 1263, 1263', 1263" are displaced to various extents: actuator 1263' is displaced to the greatest extent, and activator 1263' is displaced the least. As a result, the cap 1213 is both tilted and moved downward, so that the contact tip 1293' presses downward (against the skin surface) and laterally (off the device axis A). Because of the particular orientation and degree of the tilt, and the corresponding direction and length (displacement vector in the x-y plane) of the lateral movement, the subject recognizes this as a "dark blue" hue (DK BLU in the FIG.) having a particular saturation. For a part of the image having a different hue and/or a different saturation, the activation signal would be different, and the displacement of the actuators would result in a different tilt.

As noted above, a greater downward displacement (displacement vector in the z-direction) corresponds, in this example, to a greater brightness value (V, in the HSV color scheme). For a color having a particular hue and saturation, the subject recognizes the brightness value accordingly: a greater displacement against the skin in the z-direction is recognized as a "lighter" color. By way of illustration, the part of the image corresponding to the position of writing unit 1204 is a "bright blue"; accordingly, following the activation signal one or more of the actuators 1264, 1264', 1264" in writing unit 1204' is displaced to some extent. In the illustrated example, the hue and saturation values are the same as for the "dark blue" and, the differences in displacement of the three actuators 1264, 1264', 1264" is the same as the differences in displacement of the three actuators 1263, 1263', 1263" in writing unit 1203'. Here, however, all three actuators are displaced to an additional extent corresponding to the greater brightness. As a result, the cap 1214 is tilted in a manner similar to that of the cap 1213, but it is moved further downward, so that the contact tip 1294' presses further downward (against the skin surface) than does contact tip 1293', but to a similar extent and at a similar direction laterally (off the device axis A). Again, because of the particular orientation and degree of the tilt, and the corresponding direction and length (displacement vector in the x-y plane) of the lateral movement, the subject recognizes this as a "bright blue" hue (BRT BLU in the FIG.) having a particular saturation. And again, for a part of the image having a different hue and/or a different saturation, the activation signal would be different, and the displacement of the actuators would result in a different tilt.

Stimulation to provide brightness values (cap displacement in a z-direction) may optionally be done separately from stimulation to provide other color values (cap tilt). This allows for additional pressure to be applied during the tilt phase, to ensure good sensing of the lateral movement of the probe contact tip during tilt.

As will be appreciated the row of four writing units in the foregoing FIGs. constitute part of an array of writing units; and the array may have many more writing units in each of many rows. An example of a 6 by 8 array 1300 (that is an array having six rows of eight writing units 1302) is diagrammed in a plan view in FIG. 13. The writing units, e.g., writing unit 1302 in the array 1300 are arranged generally orthogonally in a plane parallel to the plane of the drawing sheet; that is, they lie in generally parallel rows (indicated R, R', for example) and generally parallel columns (indicated C, C', for example) perpendicular to the rows.

The writing units are illustrated symbolically in the FIG.; each writing unit 1302 includes a cap 1312 having a probe with a contact tip 1392 at an apex; and actuators 1361, 1361', 1361" coupled to corners of a side opposite the apex. The caps are mounted in a support (not shown in the FIG.) that serves to maintain the geometry of the array (that is, their arrangement in the plane of the array) while holding the writer units generally perpendicular to the skin surface and permitting the caps to move toward and away from the skin of the subject and to tilt off-axis.

In the FIGs., the array is shown as being flat; that is (see, e.g., FIGS. 12A, 12B), in the start position, with the actuators at rest and the contact tips situated adjacent the contact sites in the skin, the contact tips all lie in an x-y plane, and the skin surface is shown as being flat. In practice, of course, the surface of the subject's body is contoured, and the skin surface is not flat. Accordingly it may be preferred that the support be capable of conforming to the skin surface on which it is deployed.

A conforming support may include, for example, a flexible and resilient membrane; and the caps may be held to the membrane by affixing the side opposite the apex directly onto the membrane. Suitable membrane materials for a cap array support include, for example, sheet or film plastics; and a flexible adhesive tape may be suitable. The actuators may be mounted on an additional support that holds the actuators in alignment with the caps and at a fixed distance from the skin surface when at rest in the ready position. Such an additional support for the actuators may be a flexible and resilient membrane; and, as for the caps supporting membrane, the actuator support membrane may include, for example, sheet or film plastics, and a flexible adhesive tape may be suitable. The actuators and caps may be initially aligned and affixed in alignment during fabrication, for example. Or, alignment may be carried out during deployment on the subject, and the camera may be employed to assist in the alignment.

In the FIGs., the actuators and their coupling with the probe are represented symbolically. Any of a variety of actuators may be employed.

Each actuator may be a miniature motor, for example, such as a miniature piezoelectric micro motor; examples of these are marketed under the name "Squiggle" in a range of configurations from New Scale Technologies, Inc., Victor, N.Y. The "squiggle" motor includes piezoelectric elements (PZs) attached to a threaded nut containing a threaded screw. When the PZs are electrically excited, they change shape, causing the nut to vibrate in an orbit, thereby moving the screw.

Figure 9A:
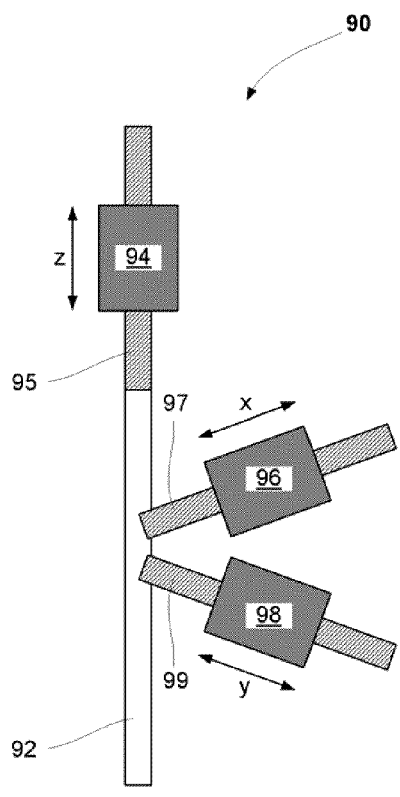
FIGS. 9A, 9B are diagrammatic sketches showing a tactile display device having actuators in different arrangements in relation to the device probe, in a diagrammatic perspective view, according to embodiments of the invention.
Figure 9B:
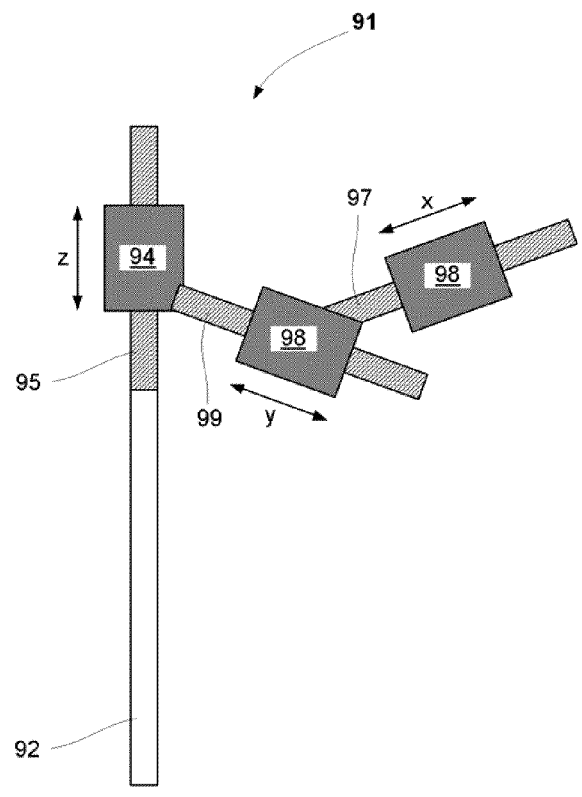

Or for example, the writer may constitute a micro electrical mechanical system (MEMS) array, in which projecting posts or pedestals constituting the probes are activatable in the z-axis direction and in directions in an x-y plane.

Where motors are employed as actuators, the actuators may be coupled to the probes by a mechanical linkage, for example. The actuator end may be coupled with the cap by, for example, a tether, which may be a flexible and/or elastic strand; or for example a spring, affixed to, respectively, the actuator end and the cap. Or, the actuator end may be coupled with the cap by, for example, affixing it using an elastic adhesive. The actuators may be coupled with the probes "in parallel", as suggested symbolically in FIG. 9A, or "in series", as suggested symbolically in FIG. 9B. In the "in parallel" configuration, each actuator is independently linked to the probe. That is, z-axis actuator 94 is directly linked 95 to the probe 92, first x-y actuator 96 is directly linked 97 to the probe 92, and second x-y actuator 98 is directly linked 99 to the probe 92. In this arrangement, as the probe is displaced by any one of the actuators, the other actuators must accommodate the movement of the probe. In the "in series" configuration, the first and second actuators are linked to one another and to the first actuator.

In the examples illustrated, each writer unit has three actuators. In some illustrated embodiments one actuator serves each of the three attributes of a hue-based color representation. In some implementations, two of the three color attributes may be suitable; for example, information about lightness (or value) and hue may provide a useful color image; or, for example information about hue and saturation may provide a useful color image. In these implementations, each writer unit need have only two actuators arranged for example to provide z-direction and one x-y plane direction displacement of the probe tip. In other illustrated embodiments the attributes may be represented by tandem movement of all three actuators, in which differences in displacement of the three actuators serves tilts the cap at a particular angle off-axis, and a depth of displacement against the skin surface serves to provide information about brightness (or value), while the tilt provides other color attributes. In some implementation of such tilt-cap embodiments two actuators may suffice to provide a useful color image.

Figure 7B:
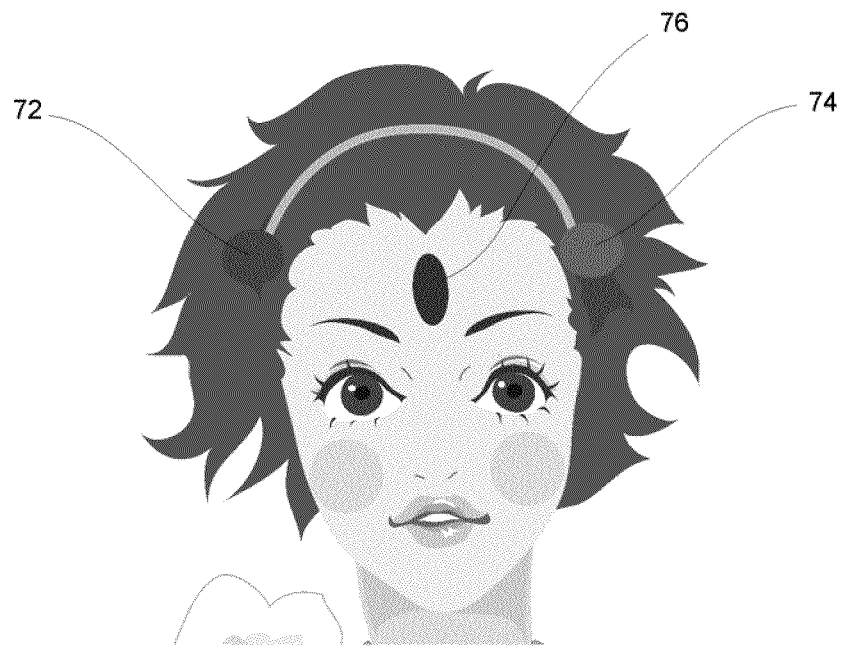
FIG. 7B is a diagrammatic sketch showing an example of deployment of basic elements of a tactile vision system on a human subject according to an embodiment of the invention.
Figure 14A:
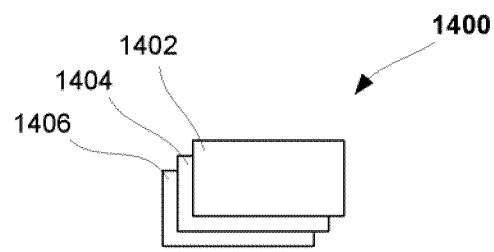
FIG. 14A is a diagrammatic sketch showing in generalized overview relationships of basic elements of a tactile vision system according to an embodiment of the invention.

A generalized system for implementing a tactile vision array is illustrated in FIG. 7A, and an example of an implementation in which all the functionalities of the tactile vision array system can be carried by the subject is illustrated in FIG. 7B. An example of an alternative system for implementing a tactile vision array is shown in FIG. 14A. The system includes, in overview, three general functionalities, namely color image sensing, by way of an image sensor 1402; color image processing, by way of an image processor 1404; and tactile color writing, by way of an image writer 1406. In this implementation all three functionalities are carried by the subject at the skin site upon which the writer unit array is deployed. Data are exchanged between the color image sensor 1402 and the color image processor 1404; and between the color image processor and the image writer 1406. Data exchange between components that carry out the various functionalities may be wired (for example, by chip-to-chip or chip-to-package or package-to-package interconnects); or, for example, the image sensor (camera) functionality and the image processor functionality may be integrated into a single chip or package or package assembly.

The image sensor 1402 may be, for example, a digital imaging device such as a digital camera or an imaging device such as a digital or analog image sensor integrated circuit chip. The image sensor may include, for example, a CMOS image sensor. The camera receives incoming light, and generates a signal representing the image. The camera may deliver, for example, a RGB (red-green-blue) signal.

The image processor 1404 may be for example, a computer (such as a personal computer, PC), or an integrated circuit chip, programmed to receive the image from the image processor, and to perform a transformation from RGB (for example) to a hue-based color representation (such as, for example, HSV or HSL) on a pixel-by-pixel basis. The transformation may be by way of a JAVA applet, for example. The output from the image processor includes the hue-based color information along with information on contrast, for each pixel.

The image writer 1406 includes an array of writer units, each having a probe and at least two (optionally three) actuators coupled to the probe and activatable to move the probe contact tip. The actuators serve to move the probe tip toward and away from the skin (in a z-direction); and to move the probe tip in a lateral direction (in an x-y plane).

The camera may have significantly greater resolution (pixel density) within the field of view than can be provided in the image writer array. Accordingly, a reduced pixelated image may be used. The image processor may treat the high-resolution image to an image having lower pixel number.

Figure 14B:
FIG. 14B is a diagrammatic sketch showing an example of deployment of basic elements of a tactile vision system on a human subject according to an embodiment of the invention.

In some implementations, all the functionalities of the tactile vision array system can be carried by the subject. One such implementation is shown by way of example in FIG. 14B. In this example, the image writer array 1406 is mounted on an area of the skin over the subject's forehead; and the camera 1402 and processor 1404 are mounted over or adjacent the writer array.

Figure 15:
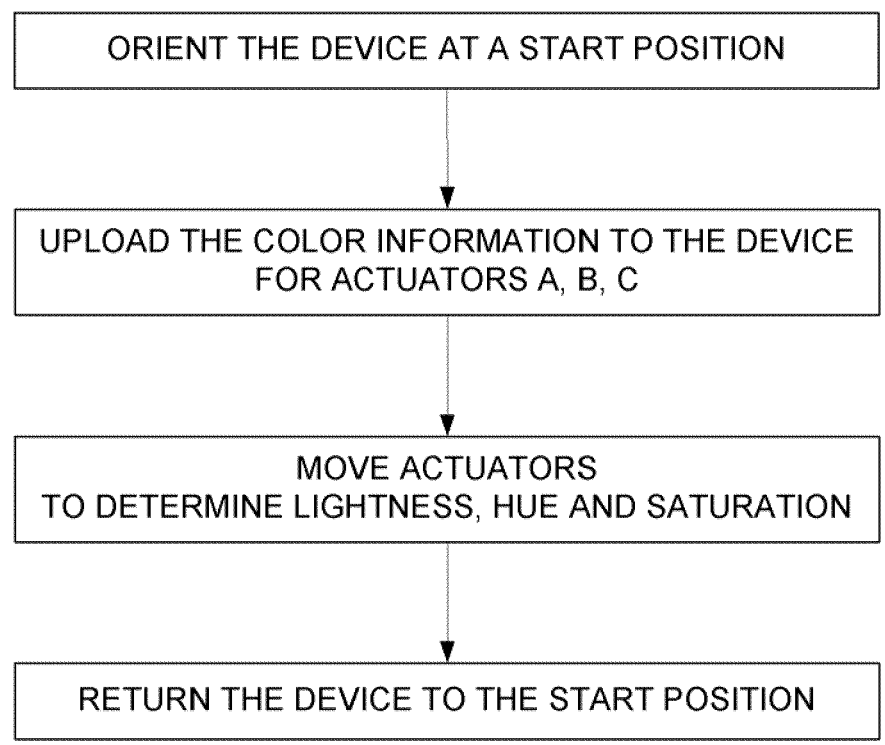
FIG. 15 is a flow diagram showing a process implementation for a tactile display device, according to an embodiment of the invention.

A tactile vision system having an array of tilt-cap type writer units can be deployed as follows, with reference to FIG. 15. The array is mounted on the skin area, with the devices in a start position, with the probe contact tips adjacent contact sites on the subject's skin surface, and with the z-axis of each device oriented generally normal to the plane of the skin surface at the site. The tip may contact or nearly contact the skin site when the device is in the start position. Color information is uploaded to the device for the actuators. The actuators are activated in response to the color information. The actuators displace the cap in a manner depending upon the color characteristics represented by the signal. The cap may tilt, causing the contact tip to move laterally off-axis, and/or the cap may move toward the skin, causing the contact tip to move toward the skin site and pressing onto and displacing the skin surface at the site. The device is returned to the start position by deactivating the actuators. The subject senses the displacements of the probe tip in relation to the skin surface as a momentary tactile sensation of the color represented by the uploaded information. The tip may slide over the skin surface during the displacements in a lateral direction, and a lubricant (such as a gel or oil or ointment, for example) may be applied to facilitate the sliding movement of the tip. Or, the tip may not slide over the skin surface, so that a lateral movement is perceived by the subject as stretching of the skin and the skin may be treated at the contact site to increase the friction between the tip and the skin.

Other embodiments are within the claims.

We claim:

1. A tactile display writer unit, comprising a cap, a probe on a first side of the cap and having a contact tip, and at least a first actuator, a second actuator and a third actuator at first, second and third sites in a triangular arrangement on a side of the cap opposite the probe, whereby activations of the first actuator, the second actuator and the third actuator result in displacements of the probe in directions having vectors in a z-direction and vectors in an x-y plane.

2. A tactile display writer, comprising a plurality of tactile display writer units of claim 1, supported in an x-y array.

3. A tactile vision system comprising the display writer of claim 2, an image processor, and an image sensor, wherein the processor is programmed to transform RGB image information from the image sensor into hue-based information having two or more attributes, and wherein the actuators in the tactile display writer are activated by the information attributes.

4. A tactile display writer unit, comprising a cap having an apex and a probe at the apex having a contact tip, at least a first actuator, a second actuator and a third actuator coupled at first, second and third sites in a triangular arrangement on a side of the cap opposite the apex, whereby activation of the first actuator results in a displacement of the first site in a direction having a first vector in a z-direction, whereby activation of the second actuator results in a displacement of the second site in a direction having a second vector in a z-direction, and whereby activation of the third actuator results in a displacement of the third site in a direction having a third vector in a z-direction.

5. The tactile display writer unit of claim 4 wherein a difference between the displacement of the first site and either one of the second and third sites results in a tilting of the cap and a displacement of the probe in a lateral direction having a vector in an x-y plane.

6. A tactile display writer, comprising a plurality of tactile display writer units of claim 4, supported in an x-y array.

7. A tactile vision system comprising the display writer of claim 6, an image processor, and an image sensor, wherein the processor is programmed to transform RGB image information from the image sensor into hue-based information having two or more attributes, and wherein the actuators in the tactile display writer are activated by the information attributes.

* * * * *